(12) United States Patent
Abel et al.

(10) Patent No.: US 7,212,545 B2
(45) Date of Patent: May 1, 2007

(54) METHOD AND APPARATUS FOR ADJUSTING THE BANDWIDTH OF A CONNECTION BETWEEN AT LEAST TWO COMMUNICATION ENDPOINTS IN A DATA NETWORK

(75) Inventors: Ulrich Abel, Essen (DE); Norbert Schoenfeld, Dortmund (DE); Werner Lindemann, Mülheim (DE)

(73) Assignee: Siemens Aktiengesellschaft, Munich (DE)

( * ) Notice: Subject to any disclaimer, the term of this patent is extended or adjusted under 35 U.S.C. 154(b) by 938 days.

(21) Appl. No.: 10/141,440

(22) Filed: May 8, 2002

(65) Prior Publication Data
US 2002/0181504 A1 Dec. 5, 2002

(30) Foreign Application Priority Data
May 9, 2001 (DE) .............................. 101 22 422

(51) Int. Cl.
*H04J 3/16* (2006.01)
(52) U.S. Cl. .................. 370/468; 370/252; 370/395.41
(58) Field of Classification Search ...................... None
See application file for complete search history.

(56) References Cited

U.S. PATENT DOCUMENTS 6,202,094 B1    3/2001  Grosser, Jr. et al.
6,658,457 B2 *  12/2003 Nishikawa et al. .......... 709/206
6,973,038 B1 *  12/2005 Narendran ................... 370/238
6,988,133 B1 *  1/2006  Zavalkovsky et al. ...... 709/223

FOREIGN PATENT DOCUMENTS

GB    2 345 613      7/2000
WO    WO 99/66689    12/1999
WO    WO 00/13369    3/2000

\* cited by examiner

*Primary Examiner*—Phirin Sam
(74) *Attorney, Agent, or Firm*—Bell, Boyd & Lloyd LLP

(57) ABSTRACT

A method and apparatus are disclosed for adjusting the bandwidth of a connection between at least two communication endpoints in a data network via a monitoring unit and a control unit. The connection in the data network is assigned at least one transmission channel for data transmission. The user data is, in this case, allocated to at least one communication connection; in particular a voice connection. The monitoring unit monitors the signaling connection for requests for at least one further communication connection; in particular, a voice connection. When a request occurs, it signals to the control unit to assign to the connection one or more additional free transmission channels for the at least one requested communication connection.

12 Claims, 3 Drawing Sheets

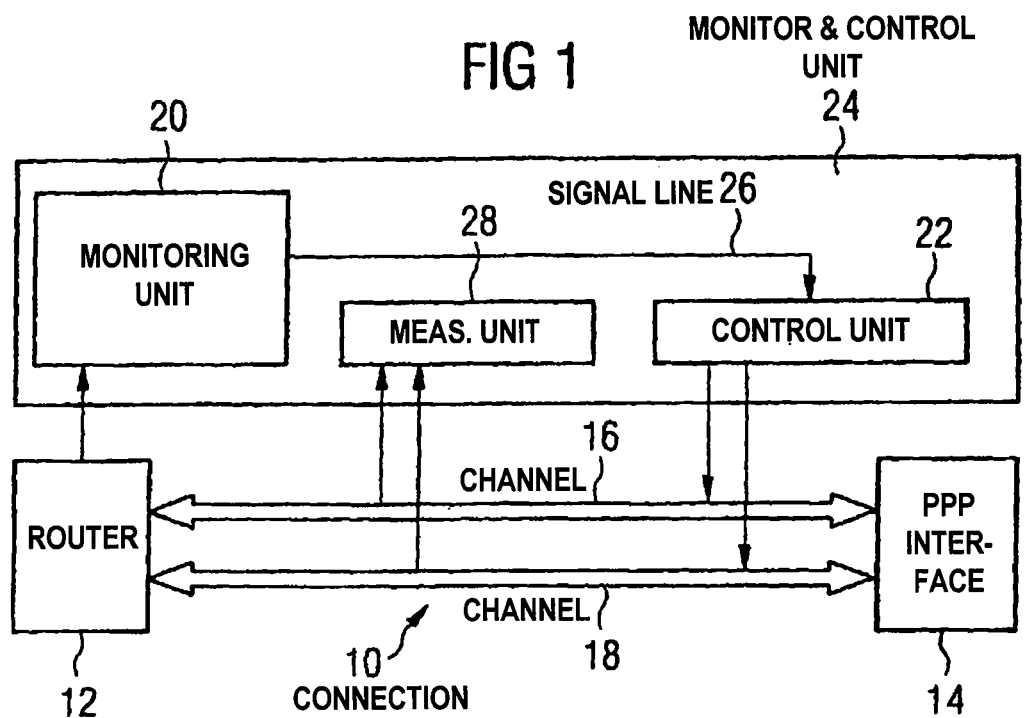
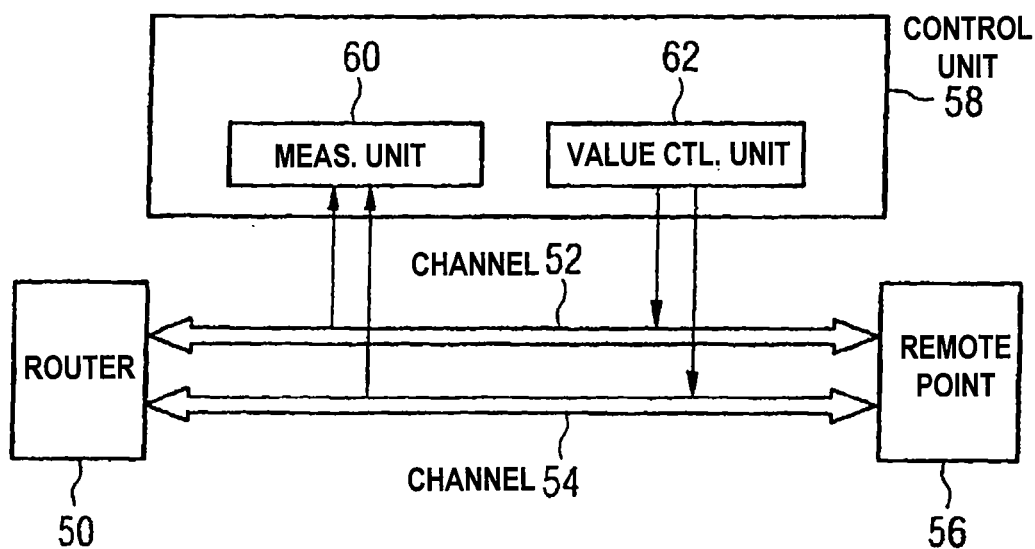

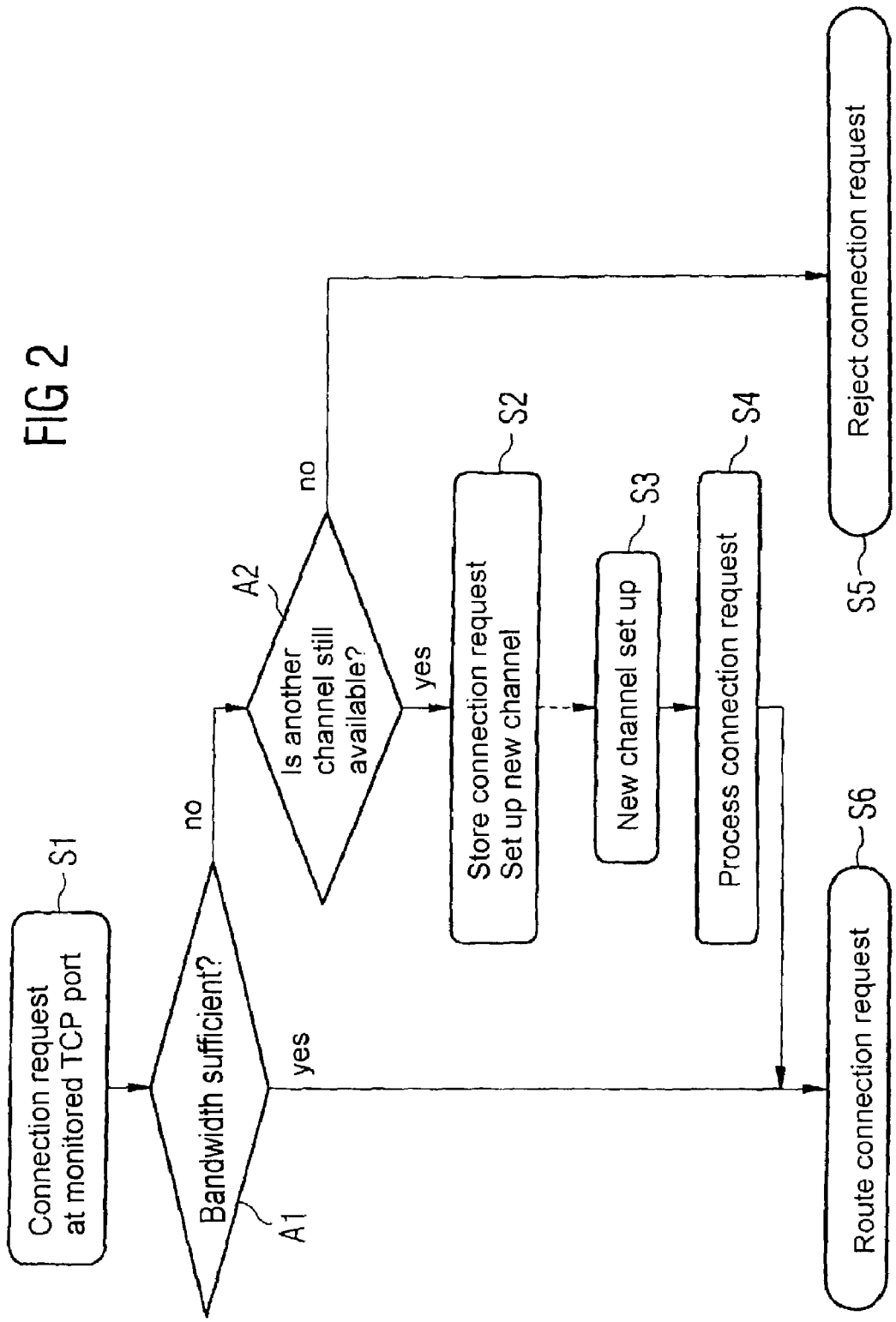

FIG 3
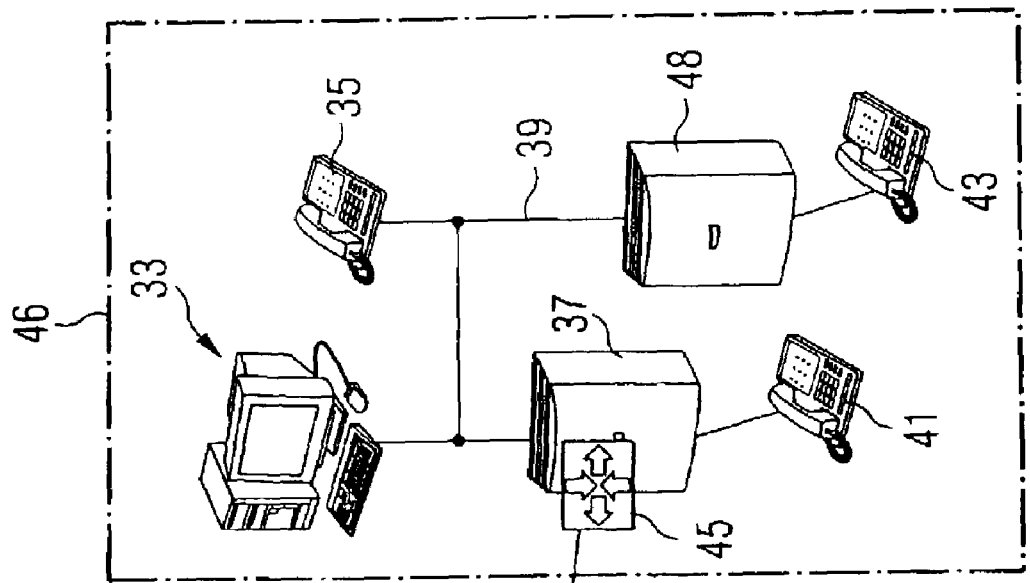
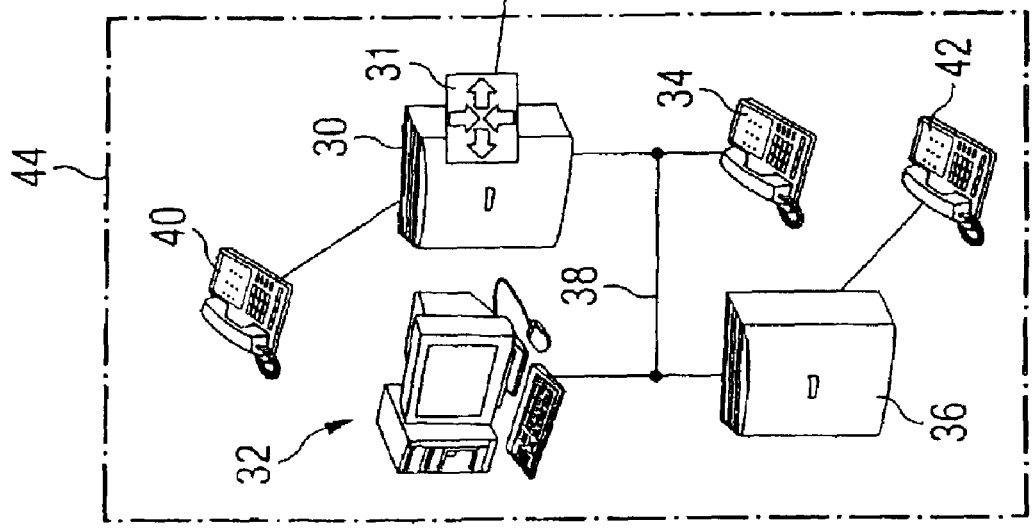

METHOD AND APPARATUS FOR ADJUSTING THE BANDWIDTH OF A CONNECTION BETWEEN AT LEAST TWO COMMUNICATION ENDPOINTS IN A DATA NETWORK

BACKGROUND OF THE INVENTION

Voice connections in telecommunication networks have in the past normally been set up on a connection-oriented basis. To do this, one line is provided exclusively for signal transmission between two communication endpoints and is, so to speak, reserved for this voice connection. In this context, the literature frequently refers to line-switching or line-oriented telecommunication.

With the arrival of packet-oriented data networks, such as the Internet, telecommunication is possible more cost-effectively than by using line-oriented telecommunication. This is due, in particular, to the capability to use the available connection resources better, since the resources that exist in a telecommunication network, in particular transmission capacities, can be used far more efficiently via packet-oriented transmission than is possible in the case of line-oriented transmission with an assured line capacity.

VoF (short for "Voice over Frame Relay") or VoIP (short for "Voice over IP") are known, by way of example, as voice packet-oriented transmission methods. VoIP technology, in particular, is predicted to be of major importance for future voice communication.

However, the transmission of voice data via packet-oriented transmission methods is subject to the problem that the transmission bandwidth available for a voice connection fluctuates as a function of the load level in a data network. Normally, this leads to delays (frequently referred to as a delay or jitter in the literature) or even to gaps in the voice connection. In the worst case, the voice connection may even fail completely. The so-called QoS (short for "Quality of Service") of such a voice connection is thus considerably worse than that of line-switching communication. In order to remedy these problems at least partially, voice compression methods, such as G.723.1, are used to reduce the bandwidth required for voice communication.

Since the Internet is frequently used as the data network for VoIP technology, despite the fact that it is not very suitable since the bandwidth available for voice communication fluctuates during most access procedures, it is particularly important to maintain a minimum bandwidth for a connection quality that is defined as the minimum. The routers which are used for setting up connections control the bandwidth on the basis of the current bandwidth demand for a voice connection. Specifically, this means that at least one new transmission channel is set up for a VoIP connection, depending on the currently required bandwidth.

However, interference can occur in the voice connection in this case since additional bandwidth is requested only when a demand occurs and, in consequence, the voice connection is subject to relatively major gaps and/or delays. The router makes its decision to request additional bandwidth on the basis of the routed data, that is to say only at a time at which additional bandwidth is already required. Thus, even with this method, a voice connection without any interference at all is impossible.

In order to explain this better, the following text refers to FIG. 4. Shown is an arrangement with a router for setting up connections between communication endpoints. Two transmission channels 52 and 54 are set up between a router 50, as a first communication end point, and a remote point 56, as the second communication end point. The remote point is a PPP interface (Point to Point Protocol), which allows the Internet protocol TCP/IP to be used via a telecommunication network. A control unit 58 includes a measurement unit 60 and a threshold value control unit 62. The measurement unit 60 measures the data throughput rate via the two transmission channels 52 and 54.

When a connection request occurs, the control unit 58 uses the measurement unit 60 to determine the data throughput rate and, if necessary, uses the threshold value control unit 62 to set up additional data channels for the requested connection. If an already existing connection requires additional bandwidth and requests this, then additional data channels are likewise set up although, in fact, the speech quality will be poor while the additional data channels are being set up. In some circumstances, the setting-up process may even occur at such a late state that the voice connection is interrupted for a certain period of time, and voice data is lost owing to the lack of bandwidth.

New methods have been proposed at the protocol level to solve these problems. One of these is an end-to-end Internet protocol from the IETF (Internet Engineering Task Force) and the company Cisco, which is referred to as RSVP (short for "Resource Reservation Setup Protocol"). In order to maintain a specific QoS for applications via the Internet, network resources, such as bandwidth, are reserved for a transmission. RSVP not only reserves resources before the transmission of data, but also adapts the transmission capacities dynamically. However, RSVP is a proprietary protocol which must be procured for all the components involved in a transmission. Furthermore, the RSVP protocol is highly complex, for which reason it is not yet widely used. Furthermore, the technical complexity for implementing the RSVP protocol is considerable.

The present invention is thus directed toward providing a method for adjusting the bandwidth of a connection between at least two connection end points in a data network, and an apparatus for carrying out the method, which ensure, even before transmission, that the bandwidth is sufficient for voice connections, and which can be used in conventional telecommunication networks without any additional protocol complexity.

SUMMARY OF THE INVENTION

The idea on which the present invention is based is to monitor the signaling connection of a connection, in particular of a voice connection, for requests for communication connections and for controlling, as a function of this, the setting up of free transmission channels for the requested communication connections. For an already existing communication connection, in particular a voice connection, this ensures that the bandwidth available for that transmission is not reduced by additional communication connections. A connection is thus set up for communication connections only with sufficient bandwidth in the form of additional free transmission channels.

In entirely general form, the expression communication connection refers to a connection for interchanging data between communication endpoints. In particular, the communication connection is a voice connection. Since, in the prior art and, in particular for package-oriented voice transmission, the number of voice connections is essentially independent of the available bandwidth, the quality of each individual voice connection becomes poorer when there are a large number of voice connections. A state such as this no longer occurs with the present invention. In fact, the bandwidth required for a voice connection is guaranteed. Furthermore, and in contrast to the RSVP protocol, no additional, autonomous protocol is required for setting up connections. This considerably reduces the complexity for implementation and the requirement for resources, particularly for memory capacity and processor performance.

The adjustment of the bandwidth for the connection between at least two communication end points in a data network is carried out via a monitoring unit and a control unit. In the data network, the connection is assigned at least one transmission channel for data transmission. The connection itself includes a signaling connection and a user channel connection. User data is transmitted in packet-oriented form via the user channel connection between the two communication endpoints. The user data is, in this case, allocated to at least one communication connection, in particular a voice connection. The monitoring unit monitors the signaling connection for requests for at least one further communication connection. When a request occurs, it signals to the control unit to assign to the connection one or more additional free transmission channels for the at least one requested communication connection.

When a request is signaled, a check is preferably carried out to determine whether the bandwidth is sufficient for the requested communication connection, particularly a voice connection.

A determination is then made as to whether a correspondingly large number of transmission channels are free for the bandwidth required for the requested communication connection. In situations in which sufficient transmission channels are not available, the connection request is stored in a queue. Free transmission channels are set up, and the stored connection request is processed, at a later time. The method according to the present invention can be implemented cost-effectively in already existing systems; for example, as a program in a read-only memory, such as a ROM. A telecommunication processor can then run this program.

If all the available transmission channels are busy, a signaled request also may be rejected. In this case, there is no need to store connection requests for a long time. On the one hand, this saves memory space while, on the other hand, it reduces the complexity for managing the stored connection requests.

In one particularly preferred embodiment, the user data is transmitted using the Voice-over-Internet protocol (VoIP for short). In other words, the method according to the present invention is currently preferably used in a WAN (short for "Wide Area Network") with packet-oriented transmission methods such as VoIP.

A communication connection is preferably characterized by a TCP port number. TCP port numbers can be implemented relatively easily in software, and sufficient numbers of them are available, for example, in Internet browsers. Thus, in principle, it would be possible to implement the method according to the present invention in existing browsers in the form of plug-ins. A request for a communication connection is preferably signaled via a message to a TCP port number.

The communication end points may be, for example, telecommunication systems, ISDN terminals and/or personal computers with data network connections.

The data network is preferably the ISDN (Integrated Services Digital Network), which is widely used, at least in Europe, where it is used for both commercial and private purposes.

The user data is preferably transmitted in packet-oriented form via the TCP/IP protocol. The TCP/IP protocol is known as the Internet protocol and is widely used in WANs, but is also being increasingly used in smaller network such as LANs (Local Area Networks). A further advantage is that many private personal computers nowadays have an Internet connection and use the TCP/IP protocol for transmitting data via the Internet. Thus, in principle, these computers are suitable for the method according to the present invention.

An apparatus for carrying out the method according to the present invention includes a router with a monitoring unit and a control unit. The monitoring unit is connected via a signal line to the control unit, in order to be able to signal a voice connection request to this control unit.

The router may have a measurement unit for measuring the data throughput rate on the transmission channels of a data connection. The determined measurement results advantageously may be used, for example, when determining the bandwidth that is still available.

The router is preferably a component of a telecommunication system which may have a LAN connection for connection via a LAN to personal computers, IP telephones with a LAN connection and/or further telecommunication systems. Personal computers and/or IP telephones thus can be used to set up voice connections via the telecommunication system and, for this purpose, can be coupled via a WAN to a packet-oriented data network for voice connections.

The telecommunication system is preferably an ISDN telecommunication system with a base rate or primary rate connection.

Additional features and advantages of the present invention are described in, and will be apparent from, the following Detailed Description of the Invention and the Figures.

BRIEF DESCRIPTION OF THE INVENTION

FIG. 1 shows an exemplary embodiment of an arrangement for connecting two communication endpoints according to the present invention, with the bandwidth of the connection between the two communication endpoints being adjustable via a router, FIG. 2 shows a flowchart of the processing of a connection request, FIG. 3 shows an exemplary embodiment of a network having two LANs in and between which voice data is transmitted via the VoIP protocol.

FIG. 4 shows an exemplary embodiment of an arrangement for connecting two communication endpoints using a router for setting up connections, according to the prior art.

DETAILED DESCRIPTION OF THE INVENTION

FIG. 1 shows a data connection 10 between a router 12 as a first communication endpoint, and a PPP interface 14 as a second communication endpoint. The data connection 10 includes two transmission channels 16 and 18, whose data throughput rate is measured by a measurement unit 28.

The measurement unit 28 is part of a monitoring and control unit 24. The monitoring and control unit 24 is coupled to the router 12, and is preferably a component of the router 12.

The monitoring and control unit 24 has a monitoring unit 20 which receives data from the router 12, and has a control unit 22. The control unit 22 is connected to the monitoring unit 20 via a signal line 26. The control unit 22 controls the setting up and clearing of connection-specific transmission channels.

In the present exemplary embodiment, the connection 10 includes a signaling connection and a user channel connection. Voice data can be transmitted via the user channel connection, which is also referred to as a user plane or a payload stream. The signaling connection, which is also referred to as the control plane or signaling stream, is used for controlling voice connections. The signaling connection through the router 12 is monitored via the monitoring unit 20.

Voice connections are produced in the router 12 by means of so-called TCP port numbers. Requests for voice connections are signaled as messages with the corresponding TCP port numbers. The monitoring unit 20 detects messages with TCP port numbers, which are passed on from the router 12 to the monitoring unit 20. The monitoring unit 20 uses the signal line 26 to control the control unit 22, which sets up free transmission channels for a requested voice connection. Free transmission channels are set up only when sufficient bandwidth for the connection 10 is still available for the requested voice connection. This is checked via the measurement unit 28, which measures the data throughput rate on the connection 10. The monitoring unit 20 can use the measurement unit 28 to check the current data throughput rate over the connection 10 and, furthermore, to determine the available bandwidth. Depending on this, the monitoring unit 20 uses the signal line 26 to drive the control unit 22, which sets up free transmission channels for the requested voice connection.

The major method steps in the processing of a connection request are shown schematically in FIG. 2. In a first step S1, a monitored TCP port signals a connection request for a voice connection. The monitoring unit 20 then determines the available bandwidth, that is to say the bandwidth which is still free, for a connection and, in a first checking step A1, checks whether the free bandwidth is sufficient for the requested voice connection. If the free bandwidth is sufficient for the requested voice connection, then a jump is made to step S6, and the connection request is routed via the router 12.

If not, that is to say if there is insufficient bandwidth, a jump is made to a further checking step A2. This checking step checks whether the connection still has free transmission levels for the requested voice connection. If this is not the case, then a jump is made to a step S5, in which the connection request is rejected. In this case, it is impossible to set up a further voice connection via that connection, owing to lack of resources.

If this is not the case, and transmission channels are still free for the connection, a jump is made to a step S2, in which the connection request is stored until a new transmission channel is set up in a step S3. The connection request is then processed in a step S4, and a jump is made to step S6, in which the connection request is routed by the router 12.

The process of setting up connections is thus continued only when sufficient bandwidth is available in the form of free transmission channels. This also precludes any temporary reductions in quality, even in existing voice connections. Furthermore, there is no need for a dedicated, and, in some circumstances, complex protocol such as the RSVP protocol.

FIG. 3 shows, schematically, the use of the method according to the present invention for voice communication between a control center 44 and a branch 46 in a company.

An ISDN telecommunication system 30 is provided in the control center 44, for connection to an ISDN communication network 49. Firstly, ISDN telephones 40 can be connected to the ISDN telecommunication system 30. Secondly, the ISDN telecommunication system 30 has a connection for a LAN 38. Personal computers 32 with a LAN connection, IP telephones 34 with a LAN connection and further telecommunication systems 36 with a LAN connection can communicate via this LAN 38.

Voice connections are set up via the LAN 38 via the VoIP protocol. As such, this means that the communication endpoints which are connected to one another via the LAN 38, such as personal computers 32, IP telephones 34 and telecommunication systems 30, 36 must support TCP-IP as the transmission protocol for handling voice connections.

The branch 46 is constructed in a similar way to the control center 44. The branch 46, thus, also contains an ISDN telecommunication system 37, which is connected to the ISDN telecommunication system 49. The central ISDN telecommunication system 37 is connected to a LAN 39 in the branch 46. Personal computers 33 with a LAN connection, IP telephones 35 with a LAN connection and telecommunication systems 48 with a LAN connection are connected to the LAN 39.

In the same way as in the control center 44, the TCP/IP protocol is provided for data transmission in the LAN 39 for the branch 46. Further (ISDN) telephones 41, 43 also can be connected to the telecommunication systems 37, 48 in the branch 46.

The ISDN telecommunication systems 30 and 37 of the control center 44 and of the branch 46, respectively, each have a respective primary rate connection 31 or 45 for connection to the ISDN telecommunication network 49. Furthermore, the telecommunication systems 30 and 37 are connected to one another via the Internet, although this is not shown. The two ISDN telecommunication systems 30 and 37 are furthermore equipped with routers (not illustrated) for routing VoIP voice connections via the Internet and via the LANs 38, 39.

The routers monitor signaling connections and, in particular, the requests for voice connections signaled via them. On the one hand, the routers control voice connections via the LANs 38 and 39 internally in the control center 44 and in the branch 46, respectively. On the other hand, the routers control the voice connections via the Internet between the control center 44 and the branch 46. To do this, the routers monitor the signaling connection of a connection in the LANs 38 and 39 as well as between the control center 44 and the branch 46, via the Internet. Requests signaled via the signaling connection for voice connections are controlled by the routers both within the control center 44 and the branch 46 and via the Internet in that, as illustrated in FIG. 2, they determine the available bandwidth for a connection and, if necessary, set up additional transmission channels as a function of this, for the requested voice connections. In the event of an overload, that is to say if there is not sufficient available bandwidth, voice connection requests are rejected by the routers. This may be done, for example, by signaling a busy signal in a communication terminal requesting a voice connection.

The use of the routers in the ISDN telecommunication systems 30 and 37 thus allows voice communication via the LANs 38 and 39, as well as between the control center 44 and the branch 46, essentially without any reductions in quality, as a result of the assignment of sufficient bandwidth for individual voice connections, as well as at the same time avoiding complex protocols such as RSVP.

Although the present invention has been described with reference to specific embodiments, those of skill in the art will recognize that changes may be made thereto without departing from the spirit and scope of the present invention as set forth in the hereafter appended claims.

The invention claimed is:

1. A method for adjusting a bandwidth of a connection between at least two communication endpoints in a data network, the method comprising the steps of:
assigning the connection at least one transmission channel for data transmission, the connection including a signaling connection and a user channel connection;
transmitting user data in packet-oriented form via the user channel connection between the communication endpoints;
allocating the user data to at least one communication connection;
monitoring, via a monitoring unit, the signaling connection for requests for at least one further communication connection;
signaling to a control unit, via the monitoring unit and in the event of a request, to assign to the connection at least one additional free transmission channel for the requested at least one further communication connection;
carrying out a check to determine whether the bandwidth is sufficient for the requested communication connection;
determining whether an appropriately large number of transmission channels are free for the bandwidth requirements for the requested communication connection;
storing the connection request in a queue; setting up free transmission channels;
deleting the stored connection request; and assigning the set-up transmission channels to the user channel connection.

2. A method for adjusting a bandwidth as claimed in claim 1, the method further comprising the step of rejecting a signaled request if all available transmission channels are busy.

3. A method for adjusting a bandwidth as claimed in claim 1, wherein the user data is transmitted using a Voice-over Internet protocol.

4. A method for adjusting a bandwidth as claimed in claim 1, wherein the communication connection includes a TCP port number.

5. A method for adjusting a bandwidth as claimed in claim 4, wherein the request for a communication connection is signaled via a message to the TCP port number.

6. A method for adjusting a bandwidth as claimed in claim 1, wherein the packet-oriented transmission of the user data is carried out via TCP/IP.

7. An apparatus for adjusting a bandwidth of a connection between at least two communication endpoints in a data network, comprising:
a router having both a monitoring unit and a control unit, with the monitoring unit being connected to the control unit via a signal line, wherein the connection is assigned at least one transmission channel for data transmission, with the connection including a signaling connection and a user channel connection, user voice-over IP data is transmitted in packet-oriented form via the user channel connection between the communication endpoints, the user data is allocated to at least one communication connection, the monitoring unit monitors the signaling connection for requests for at least one further communication connection and, in the event of a request, signals to the control unit to assign to the connection at least one additional free transmission channel for the requested at least one further communication connection,
wherein the monitoring unit carries out a check to determine whether the bandwidth is sufficient for the requested communication connection and determines whether an appropriately
and wherein the control unit stores the connection request in a queue; setting up free transmission channels and deletes the stored connection request and assigns the set-up transmission channels to the user channel connection.

8. An apparatus for adjusting a bandwidth as claimed in claim 7, further comprising a measurement unit as part of the router for measuring a data throughput rate of the transmission channels of the connection.

9. An apparatus for adjusting a bandwidth as claimed in claim 7, wherein the communication endpoints are at least one of telecommunication systems, ISDN terminals and personal computers with data network connections.

10. An apparatus for adjusting a bandwidth as claimed in claim 7, wherein the router is a component of a telecommunication system.

11. An apparatus for adjusting a bandwidth as claimed in claim 10, where the telecommunication system has a LAN connection for connection to at least one of personal computers, IP telephones with a LAN connection and further telecommunication systems via a LAN.

12. An apparatus for adjusting a bandwidth as claimed in claim 10, wherein the telecommunication system is an ISDN telecommunication system with one of a base rate connection and a primary rate connection.

* * * * *